W. A. ROGERS.
Cultivator.
No. 2,526.
Patented Apr. 1, 1842.
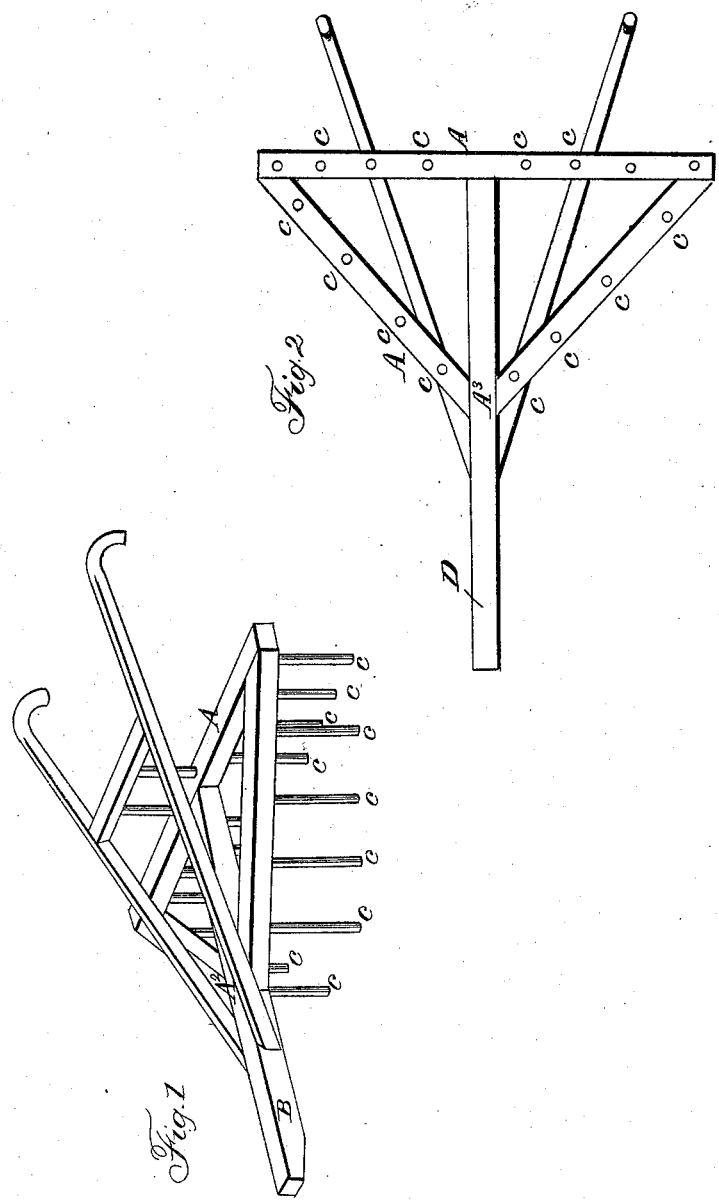

UNITED STATES PATENT OFFICE.

WM. A. ROGERS, OF SOMMERVILLE, ALABAMA.

IMPROVEMENT IN COTTON-CULTIVATORS.

Specification forming part of Letters Patent No. 2,526, dated April 1, 1842.

*To all whom it may concern:*

Be it known that I, WILLIAM A. ROGERS, of Sommerville, in the county of Morgan and State of Alabama, have invented a new and useful Improvement in Cotton-Cultivators, which is described as follows, reference being had to the annexed drawings of the same, making part of this specification.

Figure 1 is a perspective view of the improved cultivator; Fig. 2, a plan showing the under side of the harrow and the arrangement of the teeth.

Similar letters refer to corresponding parts.

This improved cultivator for cultivating cotton consists of a frame, A, made in the form of an equilateral triangle, with a beam, B, framed into the same, by which it is drawn forward, extending from the front end of the frame or angle $A^2$ to the middle of the base or rear timber, $A^3$, of the frame, said frame having teeth C projecting down therefrom for stirring the earth on either side of the row of cotton, decreasing in length gradually from the forward to the rear part of the frame, being inserted into the frame so as to leave the space between the teeth at the center of the frame, front and rear, wider than the other spaces—that is to say, the two front teeth being six inches apart and the two in the base next the center or beam being eight inches apart, while the others in the base are placed three inches apart and those in the oblique sides of the frame arranged in parallel lines cutting the center of the spaces between the teeth of the base and gradually decreasing in length from nine to six inches, the front teeth being nine inches long and the rear teeth six inches in length. The beam may be about thirty-six inches in length, the base thirty inches, and the two oblique sides about sixteen inches. There are eight teeth in the base and four in each side piece of the frame, in all sixteen teeth.

The machine works the teeth both sides of the row of cotton at the same time, the row being between the horses that draw the machine and in the center or wide spaces between the center teeth.

The machine may be drawn by one horse attached in the usual manner.

What I claim as my invention, and which I desire to secure by Letters Patent, is—

The manner of arranging the back and side rows of teeth, in combination with the frame and beam, as above described, for cultivating cotton.

W. A. ROGERS.

Witnesses:
GREEN P. RICE,
J. W. BEAN.